Dec. 29, 1942.  R. E. BELDEN  2,306,373
GRADE METER
Filed March 4, 1941
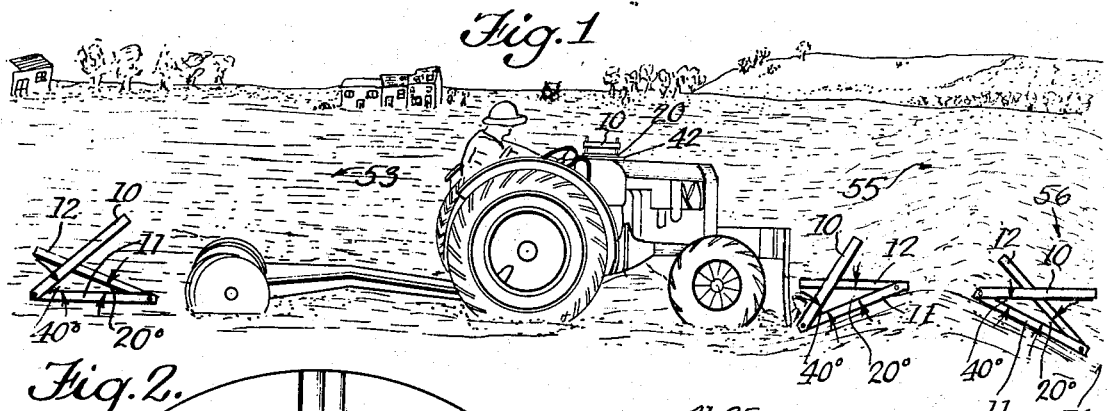
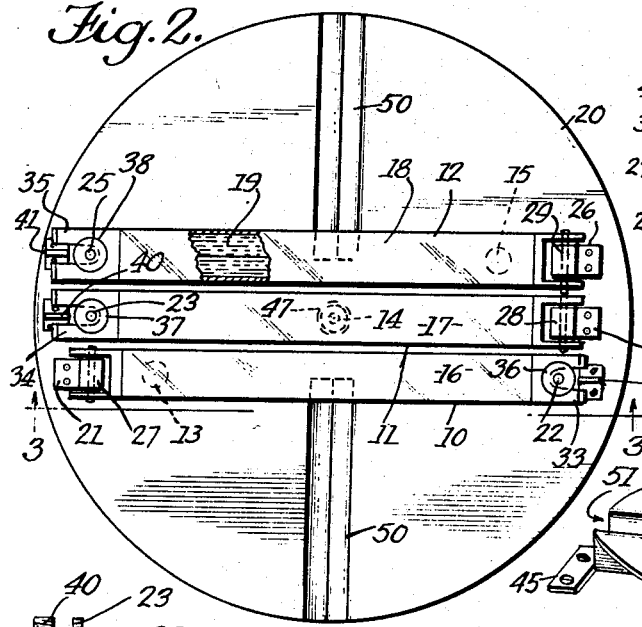
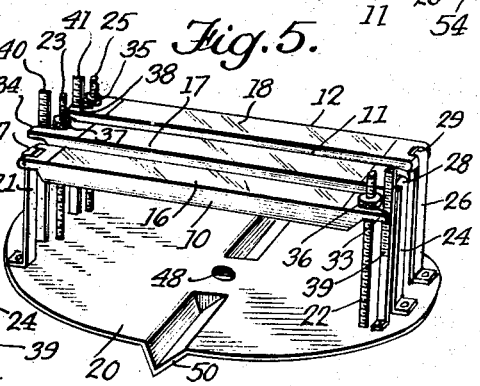
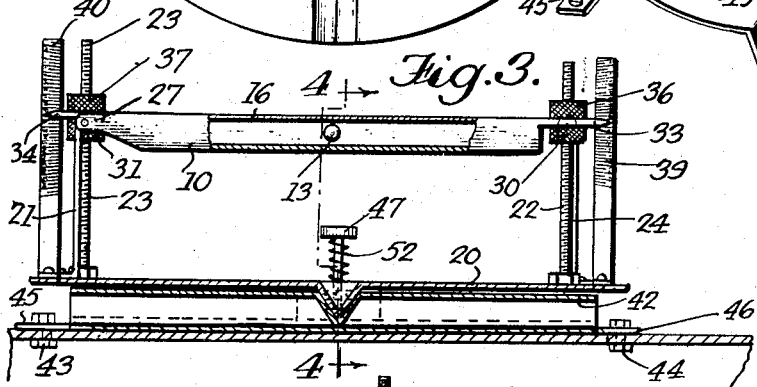
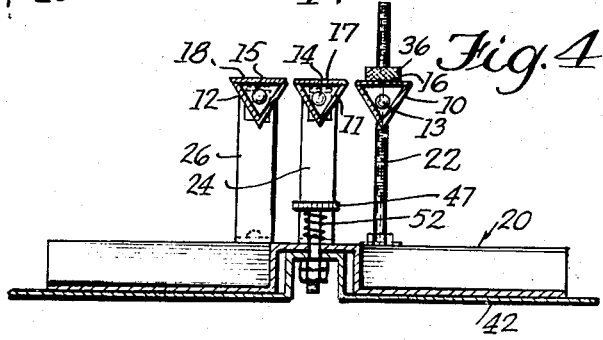
Inventor
Rex Everett Belden Patented Dec. 29, 1942

2,306,373

UNITED STATES PATENT OFFICE 2,306,373

GRADE METER

Rex Everett Belden, Smith County, Kans.

Application March 4, 1941, Serial No. 381,761

2 Claims. (Cl. 33—206)

This invention relates broadly to slope limit indicators but more particularly to a new and improved device for indicating when a predetermined angle of elevation is exceeded by an operator of a grading implement in grading a given piece of terrain along predetermined contour lines to required or desired planes or angles of elevation with respect to such planes.

Many State and Federal laws and regulations of today provide for limited degrees in angle of elevation in connection with road construction, farming, etc., either as a contractual obligation or condition precedent to certain benefits. In efforts to comply with such requirements, considerable difficulty and uncertainty has been experienced by operators of grading implements, particularly in view of the complicated character of conventional inclination gauging devices frequently requiring the employment of a navigator or at least an assistant to the grader operator. Many such instruments require considerable time for resetting the device for each change in direction of travel of the grading implement, with a consequent wasteful consumption of fuel by the idling grader-motivating means during the halting thereof for the required meter resetting.

Other prior known devices of the character are found unreliable because of their indefinite and inadequate indications, and still other devices of the general character, but of non-analogous art, are unsuitable, for the purpose of the present invention, due to their sensitive, intricate and fragile character and which are rendered inoperative or unstable under jolting and vibrating conditions such as are imperative with grading implements.

The present invention therefore aims to provide an adequately stable device of the character, affording ample indication to and operative by the operator of a grader without the aid of an assistant. The invention further aims to conserve time and fuel in providing means for eliminating the necessity of halting the grader and resetting the grade meter for prescribed angles of elevation at each change in the direction of travel of the grading implement.

Other objects and advantages, more or less ancillary to the foregoing, reside in the specific construction and aggroupment of the elements peculiar to a structure embodying the invention and by which it may be practiced, as will become apparent from a more complete examination of this specification and its accompanying drawing.

In the accompanying drawing which illustrates a preferred embodiment of the invention for a specific purpose:

Figure 1 is a pictorial illustration of an assumed piece of terrain having an eastern and a western inclination of differing angularities with respect to the plane of the acreage leading to and from the inclinations. This view also schematically illustrates the positions of the device at intervals across the field and the application of the invention to a grader-type of farm implement working the acreage along predetermined lines of contour to reduce, for example, the eastern inclination to a maximum of 20 degrees in angle of elevation and the western inclination to a maximum of 40 degrees.

Figure 2 is a detailed plan view of an embodiment of the invention;

Figure 3, a section in elevation taken along line 3—3 of Figure 2;

Figure 4, a section in elevation taken along line 4—4 of Figure 3;

Figure 5, a perspective view of the improved slope limit indicators; and

Figure 6, a perspective illustration of a turntable support upon which the indicators are rotatably mounted as shown in Figures 3 and 4.

The objects, aims and advantages sought may be accomplished according to my invention by the provision, in combination, of a plurality of horizontally disposed yet tiltably adjustable raceways, gravity controlled means moveable on the raceways, means for indicating degrees of tilt of the raceways, and ancillary elements and constructions preferred for the cooperative and operable assembly of the basic features including if desired means whereby the raceways may be adjustably rotated a predetermined number of degrees about a vertically disposed axis.

In the specific construction selected for illustrating the invention, the raceways 10, 11, and 12 are each provided with inwardly converging inner walls, or substantially V-shaped troughs. Each of the troughs are also substantially planar and of substantially uniform depth, width and convergence. The gravity controlled means moveable within the troughs are preferably spherical such as steel balls 13, 14, and 15 which are preferably of a size as will not protrude above the plane of the mouth of the trough in which they may roll. Separate lids or covers 16, 17 and 18, preferably transparent, may thereby be provided for the mouths of the troughs without frictionally hindering the rolling freedom of the balls therein. Such lids or covers are found desirable to prevent dust or other objects from falling into the troughs and becoming obstacles which may prevent the balls from observing the normal dictates of gravity. The covers 16, 17 and 18 also serve as means for retaining the balls within the troughs when the same may be abnormally jolted or tilted.

It has also been found advantageous, but not essential, to place a quantity of oil or other slow flowing liquid 19 in the troughs as a damping means to prevent the balls from responding to rapid and inconsequential tiltings, or joltings, of the troughs such as results from the vibration and jolting of a grader. In this connection the lids 16, 17 and 18 would serve additionally as a cover and retainer for the liquid.

The troughs may of course be concave or flat bottomed but it is believed that a V-shaped trough would provide greater efficiency and more accurate results. In the use of a flat bottomed trough, the ball should be allowed a certain amount of lateral or transverse play to prevent the side walls of the trough from frictionally hindering the rolling freedom of the ball. In the use of a trough having a concave bottom, the traction to the ball is considerably greater than the two point bearing provided by a V-shaped trough.

The raceways are mounted horizontally, yet longitudinally tiltable, in side by side relationship upon upright supports or standards carried by a common support 20, referred to hereinafter as a turntable. In the device illustrated, the raceways 10, 11 and 12 may be mounted bridgingly upon a common pair of standards or, as shown, upon separate pairs of standards 21—22, 23—24, and 25—26. Standards 21, 24 and 26, i. e., one of each pair, are provided with bearings 27, 28 and 29 while standards 22, 23 and 25, i. e., the other of each pair, are threaded and provided with traveling or adjustable nuts 30, 31 and 32. One end of each of the raceways is fulcrumed or hinged to the bearing of one of a pair of standards while the other end is provided with a bifurcated projection 33, 34 and 35 which straddle the other standard of the pair and is supported by the traveling nut. Lock nuts 36, 37 and 38 may be provided to hold the bifurcated portions in fixed position against the supporting nuts 30, 31 and 32. To avoid confusion in the observation of the device, the outermost raceways 10 and 11 may be reversely fulcrumed as shown.

By mounting the raceways in the elevated manner described it will be seen that they may be tilted longitudinally, either downwardly or upwardly, by adjusting the traveling nuts. In order that the degree of tilt or angle of elevation may be determined, upright gauges 39, 40 and 41 are provided. These gauges are positioned, respectively, adjacent the standards straddled by the bifurcated ends of the raceways in a manner whereby the bifurcated portions 33, 34, and 35 may serve as indicators upon the gauges which are calibrated in degrees increasing numerically in reverse order from a 0° point which is determined to indicate a level position of the raceway.

The features thus far specifically described in connection with the illustrated embodiment may be mounted by the support 20 directly upon an implement or, as a further feature of my invention, the support 20 may serve as a turntable mounted rotatably adjustable upon a base 42 which may be suitably secured to the implement as by bolts 43 and 44 through portions thereof such as lugs or ears 45 and 46 extending from the sides of the base in a manner whereby the heads of the bolts may not interfere with the rotation of the turntable.

The turntable 20 may be fixed rotatably upon the base 42 by a bolt 47 through holes 48 and 49 axially disposed in the turntable and base respectively. The turntable may be made rotatably adjustable by the provision of normally interlocking manually releasable means which may economically comprise depressions in the turntable and base to form one or more projections 50 projecting downwardly from the plane of the turntable and a plurality of cooperative recesses 51 in the surface of the base 42. The recesses 51 may be arranged as shown to receive the projections 50 at intervals of rotation, 90° for example, in order that the raceways may be reversed or, for example, turned to a cross-wise position. Normally, i. e., when the members 50 and 51 are in interlocking position, the turntable is held in resting position flat upon the base 42 by the provision of a coil spring 52 between the head of the bolt 47 and the turntable. By this means the turntable may be manually lifted sufficiently against the action of the spring to free the interlocking means for a rotation of the turntable.

In use, the instrument is mounted in a level position upon an implement where, for example, it may be conveniently observed by the operator without seriously detracting his attention from his normal line of vision in observing the performances and operation of the implement.

For a fuller understanding of the use, operation, and function of the instrument it will be assumed, for example, that a given piece of work, such as illustrated in Figure 1, has more or less flat acreage 53 and 54 leading to and from eastern and western slopes 55 and 56 of differing angles and elevation and that the grading requirements therefor are (a) that easterly inclining slopes (55) shall be graded to an angle of elevation not exceeding 20°, (b) that westerly inclining slopes (56) shall not exceed 40°, and (c) that the slopes shall not exceed a certain length. To comply with such requirements, for the assumed piece of work, lock nut 38 is run up on standard 25 and raceway 12 tilted upwardly, by adjusting nut 32, until indicator 35 of that raceway indicates an angle of elevation of 20° on gauge 41 and the lock nut 38 again tightened down. Similarly, lock nut 36 is loosened on standard 22 and raceway 10 tilted by adjusting nut 30 until the indicator 33 of that raceway indicates 40° on gauge 39 and held at that angularity by tightening down on lock nut 36. The centrally positioned raceway 11, which may be used more or less as a level, is tilted in a manner similar to those previously set but a few degrees only, i. e. sufficient to normally maintain ball 14 at the forward or hinged end of its trough when traveling substantially flat or level terrain.

With the adjustments thus made and assuming the initial direction of travel to be from west to east, the turntable 20 is rotated on its base 42 until the raceways are disposed longitudinally with the implement and with the noses or hinged ends of raceways 11 and 12 foremost in the direction of travel.

With the instrument thus set, as shown schematically at different locations in Figure 1, the implement operator, in the course of his travel from west to east, will be advised of the point at which the eastern inclination 55 commences when ball 14 rolls rearwardly in the center trough and the point at which that inclination ends when that ball returns to the forward end of the trough. In ascending the eastern inclination 55, so long as ball 15 remains in the forward end of trough 12 the operator knows that the inclination does not exceed the maximum limit of 20° in angle of elevation. Should the ball 15 roll rearwardly, however, the operator is thereby immediately advised to lower the share of his grader until ball 15 again rolls forward. Likewise, in descending the western inclination 56, if ball 13 of raceway 10 rolls forward, the operator is immediately advised that he is exceeding the limited 40° for the western slope and must elevate his grading share until ball 13 returns rearward.

When the implement operator has reached the eastern end of his course of travel and makes an about-face turn for an east-to-west trip, he need not halt the implement to reset the instrument for the now reversed order of the differing slopes, but need merely reach forward and rotate the turntable 180°. To simplify the effect of this operation, the implement may be thought of as turning 180° under the instrument, whereby the instrument is allowed to retain its original west-to-east positioning for the east-to-west trip. On the return east-to-west trip, a slight reverse adjustment of the tilt of the center trough, sufficient to carry the ball 14 at the adjustable end of trough over flat terrain, may be made if it is desired to determine the points at which the western inclination 56 commences and ends.

As another example, it may be assumed that it is desired to have a road-bed or piece of acreage graded so as to have no appreciable eastern or western slopes and a limited inclination from south to north of 15°. For this piece of work, the reversely hinged raceways may be tilted upwardly and each set, for example, at a reading of 2°. By such a setting the implement operator knows that a two degree variation is not exceeded so long as the balls of those raceways remain at opposite ends thereof. For a similar setting, two of the raceways hinged at the same ends, as raceways 11 and 12, may be employed by upwardly tilting one of the raceways 2° and downwardly tilting the other a similar number of degrees. For gauging the south-to-north inclination, the remaining raceway may be set for 15° and by an occasional 90° rotation of the turntable, during the west-to-east or east-to-west travel, the transverse slope may be checked.

With a setting of a 2° character, as just described, one may follow or lay-out contour lines of little or no angle of elevation such as advocated for plowing, furrowing and planting by present day soil conservation programs. For example, one operating a farm implement may be advised by such a setting of the instrument to bear right or left, as the case may be, in order to follow a contour of less than 2° slope.

As a further example, one of the instruments may be carried in an automobile driven across the completed work by an inspector to check or verify the accuracy of the work or compliance with requirements.

It is to be understood, of course, that the described uses, as well as the exemplary manners of setting the device, are not to be construed as limitations thereof but only exemplary of many applications of the instrument and manners of operation.

While the instrument has been described as having three raceways, it is to be understood that the number thereof may be greater or less without departing from the spirit of my invention as claimed hereinafter.

Having described my invention and illustrated an embodiment as well as the operation thereof, what I claim is:

1. In grade limit indicators for indicating conformity with and predetermined maximum allowable departures from predetermined angles of elevation in traversing a given terrain; a base adapted to be horizontally carried by an implement, vehicle and the like to be moved over said terrain; a turntable rotatably adjustable upon said base to predetermined degrees about an upright axis; manually releasable detent means normally maintaining said turntable against rotation on said base; a plurality of raceways each having inwardly converging walls forming a substantially V-shaped planar trough of substantially uniform depth, width and convergence; means for horizontally mounting said raceways upon said turntable; means for separately tilting said raceways about a transverse axis to predetermined angles of elevation; means for releasably maintaining the raceways at desired angles of elevation; gauge means for indicating the angle of elevation to which the raceways are tilted; spherical gravity controlled means within each of said troughs for indicating by their positions in the troughs conformity with and predetermined maximum departures from allowable predetermined angles of elevation; a viscous substance within said troughs as damping means for said gravity controlled means, and means for retaining said gravity controlled means and their damping means within said troughs as well as for preventing the entry into the troughs of foreign matter.

2. A universally adjustable multiple angle indicator for the simultaneous indication of a plurality of grade limit angles including in dependent cooperative relationship a plurality of guideways, gravity responsive means movable within each of said guideways and in uniform frictional relationship with their respective guideways throughout the limits of movement of said means, said guideways being disposed generally horizontal upon a releasably adjustable support common to said guideways, said support comprising a turntable and mounting therefor and being releasably adjustable by means automatically holding the turntable against rotation yet manually releasable whereby the guideways may be simultaneously rotatated to a predetermined number of degrees about an upright axis, means for separately tilting said guideways about a transverse axis to predetermined different angles whereby to indicate by the extreme positions of said gravity responsive means within the guideways conformity with and departure from predetermined allowable angles of inclination and declination of a given terrain as it is traversed by a vehicle bearing said indicator.

REX EVERETT BELDEN.